March 27, 1934.     C. G. SUITS     1,952,636

APPARATUS FOR PRODUCING PULSATIONS IN AN ALTERNATING CURRENT CIRCUIT

Filed Dec. 23, 1932

Inventor:
Chauncey G. Suits,
by Chas R. Allen
His Attorney.

Patented Mar. 27, 1934

1,952,636

UNITED STATES PATENT OFFICE 1,952,636

APPARATUS FOR PRODUCING PULSATIONS IN AN ALTERNATING CURRENT CIRCUIT

Chauncey G. Suits, Schenectady, N. Y., assignor to General Electric Company, a corporation of New York Application December 23, 1932, Serial No. 648,660

9 Claims. (Cl. 171—97)

My invention relates to apparatus for producing pulsations in an alternating current circuit. One object of my invention is the provision of improved apparatus of this character by which the effective value of the alternating current automatically is caused to undergo regularly recurring variations. Another object is the provision of such apparatus which shall be simple in construction and inexpensive to manufacture.

My invention will be better understood from the following description taken in connection with the accompanying drawing, and its scope will be pointed out in the appended claims.

Figure 1:
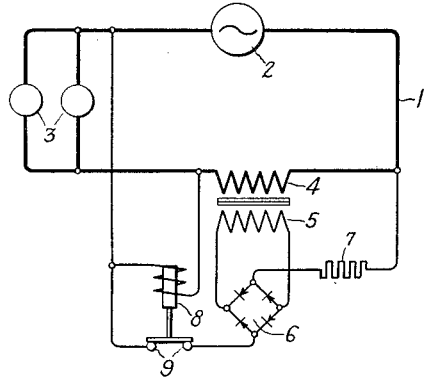
Figure 2:
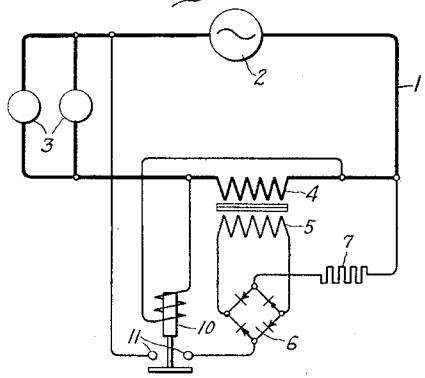

Referring to the drawing, Fig. 1 is a circuit diagram illustrating one embodiment of my invention and Fig. 2 is a similar diagram illustrating a modified form. In the embodiment of my invention illustrated by the drawing I produce automatically recurring variations in the mean effective value of the current flowing in the alternating current circuit by means of a saturable core reactor therein having a saturating winding. This winding is supplied with rectified current obtained from a rectifier connected across the alternating current circuit. For controlling the current supplied to the saturating winding I employ a circuit closing and opening device, for example a relay, which may be connected to respond either to the voltage across a load device in the alternating current circuit or to the voltage across the reactor therein. In the case of the former arrangement the relay will open the circuit supplying the saturating winding in response to an increase in voltage across the load device and conversely close the circuit of the saturating winding in response to a decrease in voltage across the load device. In the case of the latter construction the relay will close the circuit of the saturating winding in response to an increase in voltage across the reactor and conversely will open the circuit of the saturating winding in response to a decrease in voltage across the reactor. In both forms of my invention the effective value of the current in the alternating current circuit will increase and decrease automatically in a regular manner with a comparatively low frequency which is substantially independent of small changes in the frequency of the alternating current supply.

Referring now to Fig. 1 of the drawing, I have shown at 1 an alternating current circuit which is represented as supplied from the source 2 which, for example, may be a 110 volt 60 cycle source and connected across circuit 1 are a plurality of load devices represented at 3, which, for example, may be incandescent lamps comprising a sign, field border lamps of an airport, etc. Arranged in series in circuit 1 is the saturable core reactor 4 having the saturating winding 5 whereby the impedance of the reactor varies inversely in accordance with the degree of saturation of its core. The current supplied to the saturating winding 5 may be obtained from any suitable source. In the form illustrated I obtain current from the circuit 1 and rectify it by the full wave rectifier 6, a suitable controlling resistor 7 being shown in the connection. This circuit is controlled by the relay 8 whose winding connects across the load 3 whereby it is rendered responsive to the voltage drop across the load. As shown in Fig. 1 relay 8 is provided with back contacts 9 connected in the control circuit whereby when the relay winding is energized the control circuit is opened and hence the reactor is desaturated.

In the operation of the apparatus saturating current is alternately supplied to winding 5 and cut off. Each time the reactor 4 is saturated the impedance offered thereby drops to a minimum and the current supplied to the load rises to a maximum, the time required for the change being governed by the time constants of the reactor and the relay characteristics. In response to the maximum current flow in the load device the winding of relay 8 becomes energized sufficiently to cause the relay to open the control circuit whence the supply of saturating current to winding 5 is cut off and the reactor impedance rises to its maximum value. This increase in impedance likewise is governed by the time constant of the reactor. The cycle is then repeated and continues to repeat itself indefinitely, the frequency of pulsation of the alternating current in circuit 1 being relatively low and being substantially independent of small changes in the frequency of the alternating current supply.

In the modified form of my invention illustrated by Fig. 2 the relay 10 is provided with front contacts 11 instead of rear contacts as in Fig. 1 and the winding of the relay connects across the reactor 4 whereby it operates in response to the voltage across the reactor instead of the voltage across the load. The operation of this modification will be readily apparent from the above description of Fig. 1. As in the previous figure the reactor 4 is alternately saturated and desaturated by the current in its saturating winding whereby the current in the main circuit 1 automatically undergoes regular variations in mean effective value. In this case, however, when the reactor is saturated the decrease in impedance offered thereby causes the relay 10 to drop to open position thus opening the control circuit of the reactor. The reactor thereupon becomes desaturated and the resulting increase in impedance thereof causes relay 10 to become energized to close the control circuit of the saturating winding to again produce a condition of saturation of the reactor. This cycle of operation thereupon continues to repeat indefinitely. An important advantage of the above described apparatus is its extreme simplicity and although it involves a control member having moving parts this member, it will be noted, is in the control circuit and need carry only a small fraction of the total load power of the main controlled circuit.

While I have chosen to illustrate the relays 8 and 10 in a purely diagrammatic manner, I prefer to employ mercury switches for these relays. For the sake of simplicity in the drawing I have also shown the saturable core reactor 4 in a purely diagrammatic manner. In actual construction, however, each of these reactors may, for example, comprise a four-legged core having windings as represented by Fig. 2 of my copending application Serial No. 582,802, filed December 23, 1921. If preferred, each of these reactors may be in the form of two transformers each having its own magnetic circuit such, for example, as that shown in Fig. 3 of my above noted copending application.

I have chosen the particular embodiments described above as illustrative of my invention and it will be apparent that various other modifications may be made without departing from the spirit and scope of my invention which modifications I aim to cover by the appended claims.

What I claim as new and desire to secure by Letters Patent of the United States is:

1. Apparatus for producing pulsations of the alternating current in a circuit including a source of alternating current and a load device comprising a saturable core reactor device in the circuit and means including a circuit closing and opening device responsive to the voltage across one of said devices for varying the saturation of said reactor.

2. Apparatus for producing pulsations of the alternating current in a circuit including a source of alternating current and a load device comprising a saturable core reactor device in the circuit and means including a relay connected to respond to the voltage across one of said devices for varying the saturation of said reactor.

3. Apparatus for producing pulsations of the alternating current in a circuit including a source of alternating current and a load device comprising a saturable core reactor device in the circuit and means including a relay having a winding connected across one of said devices for varying the saturation of said reactor.

4. Apparatus for producing pulsations of the alternating current in a circuit including a source of alternating current and a load device comprising a saturable core reactor device in the circuit having a saturating winding and a circuit controller responsive to the voltage across one of said devices for controlling the current in said winding.

5. Apparatus for producing pulsations of the alternating current in a circuit including a source of alternating current and a load device comprising a saturable core reactor device in the circuit having a saturating winding and a relay connected across one of said devices for controlling the current in said winding.

6. Apparatus for producing pulsations of the alternating current in a circuit including a source of alternating current and a load device comprising a saturable core reactor in the circuit and a relay having a winding connected across said load device for controlling the saturation of said reactor.

7. Apparatus for producing pulsations of the alternating current in a circuit including a source of alternating current and a load device comprising a saturable core reactor in the circuit having a saturating winding and a relay having a winding connected across said load device and arranged to control the current in the saturating winding.

8. In combination, a circuit arranged to be energized from a source of alternating current and including a load device and a saturable core reactor having a saturating winding, a relay having a winding connected across said load device and a control circuit arranged to be energized from said source and including the contacts of said relay and a rectifier connected to supply rectified current to said saturating winding.

9. In combination, a circuit arranged to be energized from a source of alternating current and including a load device and a saturable core reactor having a saturating winding, a relay having a winding connected across said reactor and a control circuit arranged to be energized from said source and including the contacts of said relay and a rectifier connected to supply rectified current to said saturating winding.

CHAUNCEY G. SUITS.